United States Patent Office

3,592,662
Patented July 13, 1971

3,592,662
PROCESS FOR TREATING A COMMINUTED
PEANUT SLURRY
Chester M. Gooding, Westfield, N.J., assignor to
CPC International Inc.
No Drawing. Filed Dec. 1, 1967, Ser. No. 687,155
Int. Cl. A23l 1/36
U.S. Cl. 99—126                                    19 Claims

ABSTRACT OF THE DISCLOSURE

This process removes an alkaline malodorous distillate from a comminuted peanut slurry by passing the slurry in a thin film over a heated surface, under vacuum, while continuously agitating the film of slurry, to expose fresh portions of the slurry, and to improve heat exchange.

Peanut butter treated by the process, or prepared from a comminuted peanut slurry treated by the process, is characterized by an exceptionally fine flavor, excellent shelf life, and an absence of any unpleasant odor.

---

This invention relates to a method for treating comminuted peanut slurries in order to reduce the viscosity of same and also to remove malodorous materials therefrom.

It is known that the flavor of peanut butter, and similar spreads, sauces and the like prepared from roasted peanut slurries, changes rapidly with age. Anyone who tastes freshly-made peanut butter is immediately impressed with its fresh, mild, sweet flavor, which is quite different from the flavor of peanut butter normally encountered on the shelves of grocery stores.

Another problem encountered with peanut butter is that immediately upon opening a jar containing same a relatively unpleasant odor can be detected. This odor dissipates very rapidly once the jar has been opened, and it is not generally considered to be an objectionable characteristic by the average consumer; however, any unpleasant odor in connection with a food product is undesirable.

U.S. Pat. 3,121,015, Avera, describes a process for making peanut butter wherein a slurry of raw (rather than roasted) peanuts is prepared and then roasted. (Some or all of the roasting can be performed during preparation of the slurry, if the grinding of the peanuts generates sufficient heat to roast them.) This process provides a considerable advance in the art, as it avoids previously encountered problems of under-roasted and/or over-roasted whole peanuts, with attendant off flavors in the finished peanut butter. Problems have been encountered in adapting this process to a continuous, closed-system operation, however, because a raw peanut slurry becomes increasingly viscous as it is subjected to heat, and can even "set up," or "gel," into a heavy plastic-like mass, which is very difficult to handle.

An object of this invention is the improvement of physical and organoleptic properties of comminuted nut meat slurries and especially the improvement of the resistance of such slurries toward gelling or becoming semi-plastic as a result of heating during grinding or subsequent roasting when roasting follows grinding.

A particular object of this invention is to provide a means for the prevention of gelling of a comminuted peanut slurry when such slurry is subsequently heated or roasted.

Another object of this invention is to provide a means for removal of malodorous materials native to comminuted raw nut meat slurries and materials of objectionable odor which develop during the roasting of nut meats or raw comminuted nut meat slurries.

Other objects of the invention will be apparent hereinafter from the specification and from the recitals of the appended claims.

The process of the present invention comprises very rapidly removing volatiles from a peanut slurry by means of heat (at least about 200° F. and preferably 225° F. or higher) and reduced pressure. By the term "peanut slurry" is meant the slurry obtained by comminuting peanuts to the consistency of peanut butter. The slurry can be composed of raw (i.e. unroasted) comminuted peanuts, partially roasted comminuted peanuts, completely roasted comminuted peanuts (prepared either by first roasting whole peanuts and then grinding or by grinding raw peanuts to a slurry and then roasting), or can be a finished peanut butter (i.e. a roasted peanut slurry plus the conventional additional materials such as sucrose, dextrose, "liquid" sugar, converted corn syrups, honey, invert sugar, salt, hydrogenated oil, etc.). It should be understood that throughout the specification and appended claims the term "peanut slurry" includes all of the aforementioned forms of comminuted peanuts, unless expressly stated otherwise.

The process removes an alkaline (pH about 9), malodorous distillate. Peanut butter treated in accordance with the process, or prepared from a comminuted peanut slurry treated by the process, is characterized by an exceptionally fine flavor, excellent shelf life, and a remarkable absence of any unpleasant odor. Furthermore, when the process is applied to a raw slurry, the treated slurry is exceptionally fluid, and decreases, rather than increases, in viscosity when subjected to heat, and will not set up or gel during subsequent processing.

It is important that the evaporation (or distillation) be performed extremely rapidly and under less than atmospheric pressure, and any apparatus which will afford these conditions can be suitably emloyed. In order to obtain the necessary rapid evaporation, it is preferred to employ an apparatus which removes volatiles almost instantaneously by contacting a thin, agitated film of the material to be treated on a heated surface while maintaining the system below atmospheric pressure. This type of device is known generally as a thin, agitated film evaporator. Equipment of either the clearance blade or wiped film type can be used. The clearance blade type is preferred.

A clearance blade evaporator may be described as having a tubular, jacketed body, whose bore provides a chamber having a cylindrical or conical surface having an upright or horizontal axis. The horizontal type is preferred. One or more clearance blades are mounted on a rotor that is disposed within this chamber, for rotary movement with the blade edge moving over the cylindrical surface at some fixed small clearance distance from the cylindrical surface.

The ends of the body are closed, and a vacuum means is connected to the chamber to maintain it at a reduced pressure. Means are provided for delivering a liquid or slurry to the one end of the chamber, and for distributing it on the cylindrical surface, for passage thereover in the form of a thin film. A gutter or other collecting means is disposed at the other end of the chamber, to direct the processed material to a pump or chambered, rotating valve which removes the material from the evaporator. Heating fluid can be passed through the jacket, to heat the material in the film.

In operation, the blade edge or edges continuously disrupt the liquid or slurry film as it passes over the cylindrical surface, to expose fresh surfaces of the material. At the same time, the material is heated and subjected to a reduced pressure. Volatile components are therefore removed rapidly, and can be recoverd, if desired, by a condenser, or they can simply be permitted to escape through the exhaust system.

A wiped-film evaporator is similar in construction, but has blades that are biased by springs, centrifugal force, or otherwise, constantly to be urged toward the cylindrical surface. In operation, the blade disrupts the film and returns it to the cylindrical surface, again to form a film thus exposing fresh surfaces continuously.

The process of the present invention should be conducted under a vacuum sufficient to withdraw rapidly the volatilized materials from the peanut slurry. A vacuum of 27 to 29 inches of mercury is entirely suitable, although higher and lower pressures can be employed. The temperature should be at least about 180° F., and preferably at least about 200° F.; temperatures much below 180° F. will not result in sufficient removal of volatiles. The upper temperature limit is that above which the slurry will be deleteriously affected. When processing a peanut slurry other than a finished peanut butter, a temperature of as high as 375° F. can be employed. This high a temperature will cause caramelization of the sugars in finished peanut butter, however; therefore the temperature should not be above about 275° F. for the processing of finished peanut butter or other sugar-containing peanut slurries. The preferred temperature ranges are from about 220° F. to about 320° F. for non-sugar containing slurries, and from about 200° F. to about 275° F. for peanut butter or the like.

The process will, under ordinary conditions of operation, reduce the moisture content of the peanut slurry to less than 1% by weight (and preferably about 0.5% or lower). It has been discovered that lowering the moisture content of peanut butter to this level (peanut butter normally contains from about 1.5% to 2.5% moisture) has a desirable effect in that the mounting properties of the peanut butter are improved, possibly due to an apparent decrease of particle size through diminished agglomeration and micro-clumping at the lower moisture content.

If, however, it is desired to prepare a peanut butter of normal moisture content, the process of the invention can be employed with resulting removal of objectionable materials by injecting steam into the slurry prior to or during the treatment and by reducing temperature, and/or by less reduction of internal pressure in the thin film evaporator. For example, if a thin film evaporator is used, steam can be injected into the slurry stream just prior to its entry into the apparatus. Under these conditions, the moisture content of the untreated slurry is augmented by the injected steam. In such a case the amount of steam, the temperature, the vacuum, the thickness of the film of slurry under treatment are all mutually adjusted to result in substantial steam stripping and condensate yield while still maintaining the desired amount of moisture in the treated comminuted peanut slurry. The effect is similar to that of a steam distillation.

A peanut slurry or peanut butter processed according to this invention also may be restored to normal moisture content of 1.5% to 2.5% moisture by incorporation of potable water to replace the native moisture lost while accomplishing the desired deodorization.

The following examples will illustrate the practice of the invention. They are presented for illustrative purposes only and should not be construed as limiting the scope of the invention in any way. In all of the examples a commercially available horizontal-type, thin, agitated film processor was employed that had a surface area of one square foot, and that was manufactured by The Kontro Company, Inc., Petersham, Mass. All parts and percentages are by weight unless otherwise expressly stated.

EXAMPLE I

This example illustrates the effect of the process of the invention upon the viscosity of a raw peanut slurry. Raw peanuts were ground to form a slurry, which had a moisture content of about 5%, and the slurry was divided into two batches.

The viscosities of samples of the first batch were determined with a Brookfield viscometer at different temperatures and different spindle speeds.

The second batch was treated in the thin film processor at a temperature of 242° F. and a vacuum of 28.5 inches of mercury. The treatment reduced the moisture content to 0.4%, and removed a malodorous alkaline (pH 9) distillate. Viscosities of samples of the treated raw slurry were then determined. The data are tabulated in Table I.

TABLE I.—EFFECT OF THIN-FILM VACUUM TREATMENT UPON A RAW PEANUT SLURRY

| Sample | Brookfield viscometer speed, r.p.m. | Temp., °C. | Viscosity, cps, |
|---|---|---|---|
| Raw peanut slurry, untreated | 1 | 30 | 115,000 |
|  | 2 | 30 | 80,000 |
|  | 5 | 30 | 49,000 |
|  | 10 | 30 | 33,200 |
| Raw peanut slurry, untreated | 2 | 100 | 145,000 |
|  | 5 | 100 | 64,000 |
|  | 10 | 100 | 32,000 |
| Raw peanut slurry, untreated | 2 | 115 | 160,000 |
|  | 5 | 115 | 64,000 |
|  | 10 | 115 | 32,000 |
| Raw peanut slurry, treated | 1 | 15 | 32,000 |
|  | 2 | 15 | 24,000 |
|  | 5 | 15 | 17,900 |
|  | 10 | 15 | 14,300 |
| Raw peanut slurry, treated | 1 | 60 | 6,000 |
|  | 2 | 60 | 4,800 |
|  | 5 | 60 | 3,200 |
|  | 10 | 60 | 2,560 |
| Raw peanut slurry, treated | 1 | 80 | 3,200 |
|  | 2 | 80 | 3,200 |
|  | 5 | 80 | 1,920 |
|  | 10 | 80 | 1,600 |

As can be seen from the table, the treatment resulted in a fluid raw slurry which exhibited low initial viscosities and decreased viscosities as the temperature of measurement was raised. In contrast, the untreated raw slurry, exhibited increased initial viscosities as the temperature of measurement was increased, and while agitation substantially reduced these viscosities, they remained significantly higher than those of the treated slurry.

EXAMPLE II

A raw, comminuted peanut slurry of approximately 4% moisture content was passed through the thin film evaporator at the rate of 131 pounds per hour, under a vacuum of 28 inches of mercury. The product was discharged at a temperature of 297° F., after which it was immediately cooled to 140° F. in an agitated barrel heat exchanger. The non-roasted product had a moisture content of 0.5%, was very fluid, and had a pleasant, sweet taste.

EXAMPLE III

A roasted peanut slurry prepared according to Avera's U.S. Patent 3,121,015 was treated as described in Example II. The product was converted to peanut butter by the addition of a stabilizer and seasoning. After 3½ months shelf aging, the peanut butter was still sweet and completely free of staleness. Practically no unpleasant odor could be detected when the jar was opened.

EXAMPLE IV

Peanuts were roasted by a fluid bed process, deskinned and ground to a fine slurry. The slurry, which contained 2% moisture, was passed through the thin film evaporator at a rate of 67 pounds per hour, at a temperature of 320° F., and under a vacuum of 15 inches of mercury. The smooth and fluid product of 0.8% moisture content was then converted into peanut butter, the odor and flavor of which was decidedly improved over conventional peanut butter.

EXAMPLE V

Finished peanut butter containing stabilizer, salt and sugar, and which had a moisture content of about 2%, was subjected to thin film treatment at temperatures between 225° F. and 250° F. and 29 inches of vacuum. The treated product had a moisture content of 0.6% to 0.8%, and the mouthing properties were greatly improved. The product was also substantially free of objectionable odor.

The process was then repeated, except a temperature of about 180° F. was maintained during the thin film treatment. The resulting peanut butter exhibited a slight unpleasant odor when the jar was opened, which was greater than that of the previous sample which had been treated at a higher temperature, but substantially less than that encountered with conventional peanut butter. This indicates that the process of the invention should be conducted at a temperature of at least about 180° F. in order to obtain the maximum benefit therefrom.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A process for treating a comminuted peanut slurry comprising substantially instantaneously removing volatiles therefrom by subjecting an agitated thin film of said slurry to a temperature of at least about 180° F. in the presence of a vacuum.

2. A process for removing malodorous materials from a comminuted peanut slurry and rendering said slurry fluid and resistant to gelling upon heating, comprising subjecting an agitated thin film of said slurry to a temperature of at least about 180° F. in the presence of a vacuum, whereby the moisture content of said slurry is substantially instantaneously reduced to less than about 1% by weight.

3. The process of claim 2 wherein said slurry is subjected to a temperature of from about 200° F. to about 375° F.

4. The process of claim 2 wherein said slurry is subjected to a temperature of from about 220° F. to about 320° F.

5. The process of claim 2 wherein the peanut slurry comprises peanut butter which contains sugars, and wherein the film of the slurry is subjected to a temperature of from about 200° F. to about 275° F.

6. The process of claim 2 wherein the moisture content of said peanut slurry is reduced to not more than about 0.5% by weight.

7. The process for removing malodorous materials from a comminuted, raw peanut slurry and rendering said slurry exceptionally fluid and resistant to gelling upon heating, comprising subjecting an agitated thin film of said slurry to a temperature of from about 200° F. to about 375° F. in the presence of a vacuum, whereby volatiles are removed from said slurry substantially instantaneously and the moisture content of said slurry is reduced to less than about 1% by weight.

8. The process of claim 7 wherein the moisture content of said slurry is reduced to not more than about 0.5% by weight.

9. The process of claim 7 wherein the slurry is subjected to a temperature of from about 220° F. to about 320° F.

10. A process for removing malodorous materials from a comminuted roasted peanut slurry and rendering same exceptionally fluid and resistant to gelling comprising subjecting an agitated thin film of said slurry to a temperature of from about 200° F. to about 375° F. in the presence of a vacuum, whereby volatiles are removed from said slurry substantially instantaneously and the moisture content of said slurry is reduced to less than about 1% by weight.

11. The process of claim 10 wherein the moisture content of said slurry is reduced to not more than about 0.5% by weight.

12. The process of claim 10 wherein the slurry is subjected to a temperature of from about 220° F. to about 320° F.

13. A process for removing malodorous materials from peanut butter comprising subjecting an agitated thin film of the peanut butter to a temperature of from about 200° F. to about 275° F. in the presence of a vacuum, whereby alkaline volatile material is removed from the peanut butter substantially instantaneously.

14. The process of claim 13 wherein the treatment reduces the moisture content of the peanut butter to less than about 1% by weight.

15. The process of claim 13 including the step of injecting steam into the peanut butter during the treatment in such amount that the alkaline volatile material is removed from the peanut butter and the total moisture content of the peanut butter is not reduced.

16. A process for removing volatile material from a comminuted peanut slurry comprising:
    passing the slurry in a thin film over a surface at an elevated temperature up to about 375° F.,
    maintaining the slurry in said film under a reduced, subatmospheric pressure,
    agitating said film to expose fresh portions of the slurry to the reduced pressure, and then
    recovering the processed slurry.

17. A process in accordance with claim 16 wherein the slurry is a finished peanut butter, and the elevated temperature does not exceed about 275° F.

18. A process in accordance with claim 16 wherein the slurry is a raw peanut slurry, and the elevated temperature is in the range from about 220° F. to about 320° F.

19. A process in accordance with claim 16, in which the processed slurry is recovered at a moisture content of less than about 1% by weight.

References Cited

UNITED STATES PATENTS

| | | | |
|---|---|---|---|
| 1,476,649 | 12/1923 | Schad | 99—128 |
| 2,044,639 | 6/1936 | Schneider | 99—126 |
| 2,282,791 | 5/1942 | Musher | 260—428 |
| 2,508,919 | 5/1950 | Jakobsen | 260—428 |
| 2,674,609 | 4/1954 | Beal | 260—428X |
| 3,246,991 | 4/1966 | Avera | 99—128 |
| 3,265,507 | 8/1966 | Japikse | 99—128 |
| 3,272,850 | 9/1966 | Richey | 260—428 |
| 3,396,041 | 8/1968 | Laskin | 99—128X |

FRANK W. LUTTER, Primary Examiner

R. HALPER, Assistant Examiner

U.S. Cl. X.R.
99—128; 260—428